United States Patent [19]

Yamada et al.

[11] Patent Number: 5,589,225
[45] Date of Patent: Dec. 31, 1996

[54] GRANULATING-COATING APPARATUS AND GRANULATING AND COATING METHOD USING THE SAME

[75] Inventors: Shuri Yamada, Hosoe-cho; Masanori Ogawa, Hamakita; Kazuomi Unosawa, Hamamatsu, all of Japan

[73] Assignee: Freund Industrial Co., Ltd., Tokyo, Japan

[21] Appl. No.: 397,568

[22] Filed: Mar. 2, 1995

[30] Foreign Application Priority Data

Mar. 11, 1994 [JP] Japan .................. 6-040860

[51] Int. Cl.$^6$ ..................................... B05D 7/00
[52] U.S. Cl. ................ 427/212; 427/213; 427/421; 427/426; 118/17; 118/19; 118/302; 118/303; 118/DIG. 5
[58] Field of Search ..................... 118/302, 303, 118/19, 17, DIG. 5; 427/212, 421, 424, 213

[56] References Cited

U.S. PATENT DOCUMENTS 4,469,043  9/1984  Kohler et al. ................. 118/63
4,766,839  8/1988  Dunajtschik ................... 118/302

*Primary Examiner*—Shrive Beck
*Assistant Examiner*—David M. Maiorana
*Attorney, Agent, or Firm*—Kane, Dalsimer, Sullivan, Kurucz, Levy, Eisele and Richard, LLP

[57] ABSTRACT

This is a granulating-coating apparatus comprising: a spraying means for spraying a binder liquid or a coating liquid onto articles to be processed, which are received in a rotary drum; a brush provided in a manner to be movable relatively to the spraying means in the rotary drum, for contacting a spray gun formed in the spraying means and removing adhered articles on the spray gun; and an adhered article sucking device provided in the vicinity of the brush, for receiving the removed adhered articles. With this arrangement, the adhered articles on spraying openings of the spraying means can be removed completely without contamination of the articles to be processed with the removed adhered articles.

32 Claims, 11 Drawing Sheets

GRANULATING-COATING APPARATUS AND GRANULATING AND COATING METHOD USING THE SAME

BACKGROUND OF THE INVENTION

1. Field of the Invention

This invention relates to a granulating-coating apparatus capable of removing adhered articles such as a bonding agent or a coating liquid which adhere to spray guns, i.e., spray guns formed in a spraying means, and relates to a method of granulating and coating by use of the apparatus.

2. Related Art Statement

As an apparatus for granulating or coating pharmaceuticals and foodstuffs, there has been widely known such an apparatus that articles to be processed (herein after simply referred to as "articles") such as tablets, granules or nuts are contained in a processing container as a rotary drum being rotated about a substantially horizontal rotary axis to form an accumulated layer on the articles, and liquid such as a binder liquid or a coating liquid is sprayed from spray guns to the articles, and then gas is caused to flow through the accumulated layer on the articles, so that granulating and coating can be performed. In the apparatus as described above, such a disadvantage is presented that a part of the binder liquid or the coating liquid is dried and solidified in the vicinity of the forward ends of the spray guns, and peeled off and dropped into the processing container, to thereby contaminate the articles and deteriorate the quality of the articles. This disadvantage is particularly notable in the case where sugar coating, chocolate coating and so forth are performed.

Furthermore, in the case of a fluidized bed granulating-coating apparatus, in which air is caused to flow from under the articles, in addition to the above-described disadvantage, such a disadvantage is presented that fine particles accompanied with fluidized air adhere to the spray guns.

In order to obviate the disadvantage of the adhesion of the coating liquid or the binder liquid to the spray guns as described above, various techniques have heretofore been proposed.

For example, Japanese Patent Laid-Open No. 62-11576 discloses a movable and elastic partition walls provided in the vicinity of forward ends of spray guns and distortion is given to the partition walls, to thereby peel off the adhered articles. Furthermore, in Japanese Patent Laid-Open No. 62-155956, a guide is detachably provided in a manner to cover a side surface of a forward end portion of a spray gun, an extensible diaphragm is mounted in a manner to cover a nozzle formed in the spray gun, and air is supplied to the diaphragm to expand it, to thereby remove the adhered articles. However, in these apparatuses, although the adhered articles such as the coating liquid or the binder liquid, which adhere to the nozzles and thereabout, can be removed only partially, it is difficult to completely remove the adhered articles on the nozzles themselves because the apparatus is of deforming elastic members around the nozzles such as the partition walls and the diaphragm. And, it is not desirable that the adhered articles, which have been removed, are dropped to contaminate the articles. Further, because the elastic members are deformed, the durability of the apparatus itself is not satisfactory.

Furthermore, in Japanese Patent Laid-Open No. 60-241956, there is proposed an apparatus in which a scratching blade is rotatably mounted on an outer periphery and an end surface of an outer tubular portion which is covering outer peripheries of ends of nozzles formed in spray guns. However, in this apparatus, the coating liquid or the binder liquid adheres to the scratching blade, and there is presented the disadvantage similar to the case where the coating liquid or the binder liquid adheres to the spray guns.

In Japanese Patent Laid-Open No. 60-501148, there is proposed that spray guns are provided in a manner to be movable between a spraying position and a cleaning position and then these spray guns are cleaned by cleaning liquid stored in a shielding means provided on rotating axis in a pan. However, in this apparatus, there are presented such a disadvantage that the mechanism is complicated so as to have the space within the pan narrowed, and another disadvantage that the shielding means itself is stained with the adhered articles.

In Japanese Patent Laid-Open No. 2-233164, there is proposed an apparatus comprising a case; spray guns housed in said case, said spray guns being arranged to be movable between a spraying position and a cleaning position; and a solution tank provided in said case which stores a cleaning solution, in which the spray guns are immersed in said cleaning solution to be cleaned. However, in this apparatus also, there is presented the disadvantage similar to the apparatus described in Japanese Patent Laid-Open No. 60-501148.

SUMMARY OF THE INVENTION

It is an object of the present invention to provide a technique of granulating and coating, which is capable of completely removing adhered articles on spray guns formed in a spraying means for spraying a binder liquid or a coating liquid without contamination of articles received in a processing container with the adhered articles.

Furthermore, it is another object of the present invention to provide a technique of granulating and coating, which is capable of completely removing adhered articles on spray guns formed in a spraying means without decreasing a processing capacity of an apparatus itself.

The following is the description of the outline of the typical one from among the inventions disclosed in the present application.

A granulating-coating apparatus according to the present invention comprises: a processing container in which articles to be precessed are contained; a spraying means for spraying a binder liquid or a coating liquid onto the articles; an adhered article removing means provided in the processing container in a manner to be movable relatively to the spraying means, for removing adhered articles on a spray gun in the spraying means; and an adhered article receiving means for receiving the adhered articles removed by the adhered article removing means.

In this granulating-coating apparatus, the aforesaid adhered article receiving means may be an adhered article sucking device provided in the vicinity of the adhered article removing means, for sucking and receiving the adhered articles removed by this adhered article removing means.

Furthermore, the aforesaid adhered article receiving means may be an adhered article dropping member provided at the outside of the processing container in a manner to include therein the adhered article removing means, for receiving the adhered articles removed and dropped by this adhered article removing means.

In these granulating-coating apparatuses, the aforesaid adhered article removing means may be a brush for contacting to the spray gun in the spraying means to wipe off the adhered articles or may be compressed gas for blowing off the adhered articles on the spray gun in the spraying means.

Further, in these granulating-coating apparatuses, there may be provided an image observing section for observing a spray pattern of a binder liquid or a coating liquid, which is sprayed from a spraying means, and a control section for analyzing the observed spray pattern obtained by the image observing section and for carrying-out an operation of removing the adhered articles when it is judged to need the operation.

The processing container may be a rotary drum rotated about a substantially horizontal rotary axis or be a fluidized bed apparatus, in which gas is introduced from under the articles received in the container, whereby a fluidized bed is formed therein.

Furthermore, a method of granulating and coating according to the present invention is a method of granulating and coating for articles received in a processing container by use of these granulating-coating apparatuses, for removing adhered articles on a spray gun in a spraying means by an adhered article removing means, and for receiving the removed adhered articles in an adhered article receiving means.

According to the above-described technique of granulating and coating, the adhered articles, i.e., the splayed binder liquid and the like, and fine particles accompanied with the fluidized air in the fluidized bed apparatus, which are adhered to the spray guns formed in the spraying means for spraying the binder liquid or the coating liquid onto the articles received in the processing container, are removed by the adhered article removing means, and thus removed adhered articles are received into the adhered article receiving means. Accordingly, the adhered articles on the spray guns in the spraying means for spraying the binder liquid or the coating liquid can be completely removed without contamination of the articles in the container with the adhered articles and without reducing an effective capacity of the processing container.

The above-described and other objects and the novel features of the present invention will become apparent more fully from the description of this specification and the accompanying drawings.

DETAILED DESCRIPTION OF THE INVENTION

The embodiments of the present invention will be hereunder described in detail with reference to the accompanying drawings.

Figure 1:
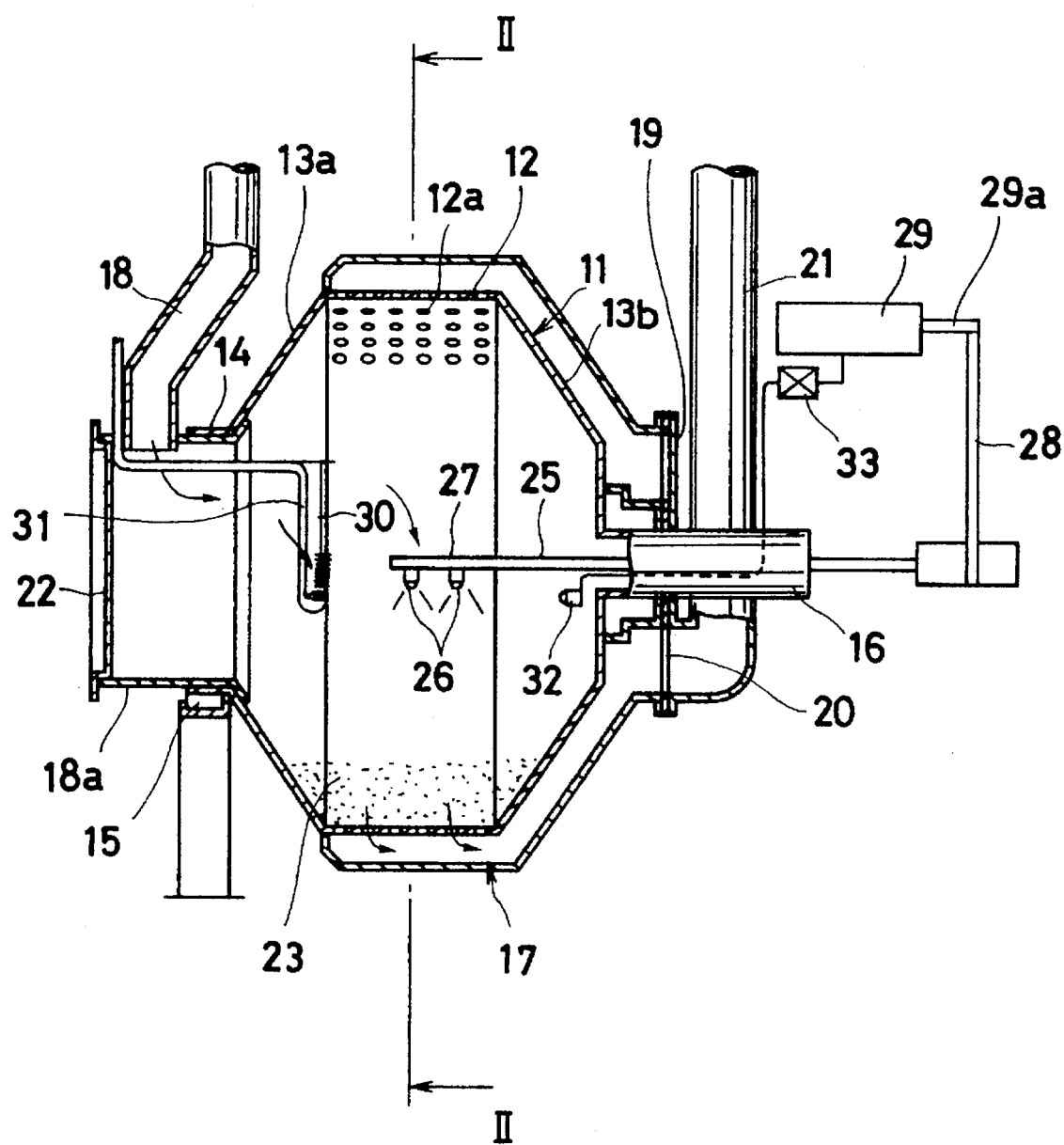
FIG. 1 is a sectional view showing one embodiment of the granulating-coating apparatus according to the present invention.
Figure 2:
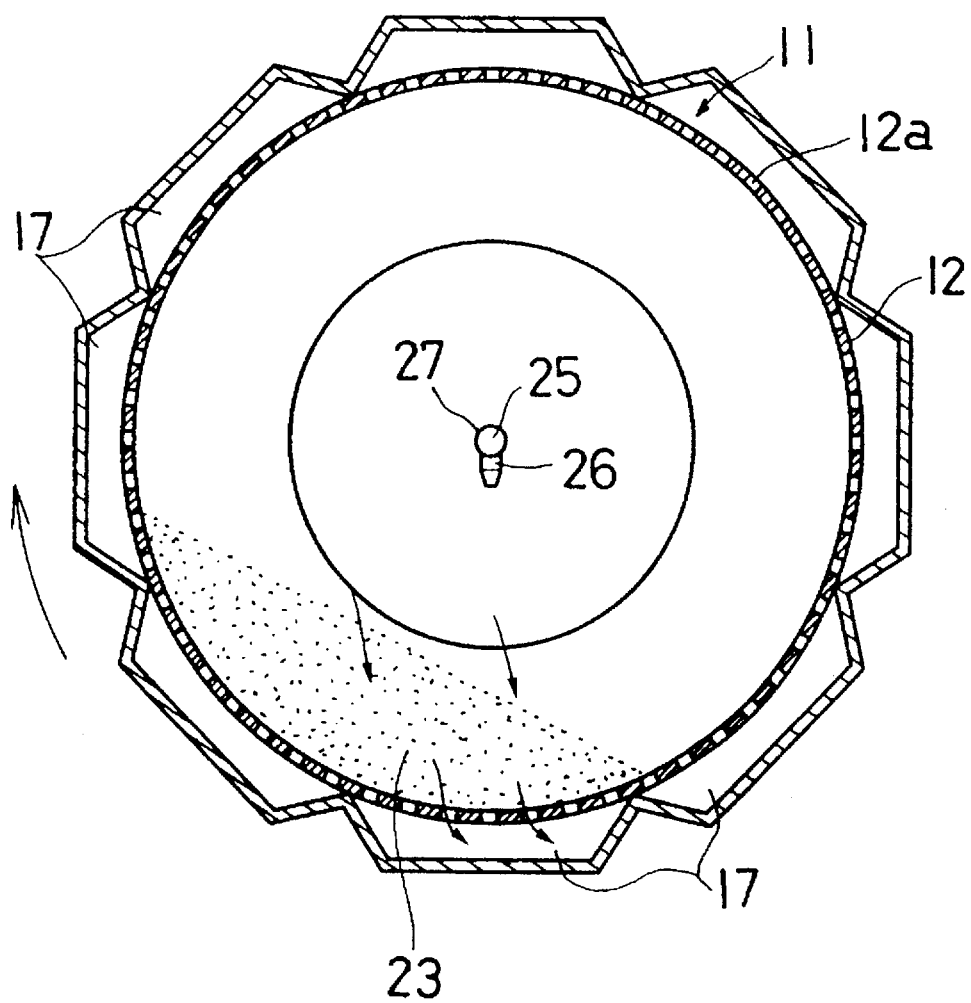
FIG. 2 is a sectional view taken along the line II—II of the granulating-coating apparatus shown in FIG. 1.
Figure 3:
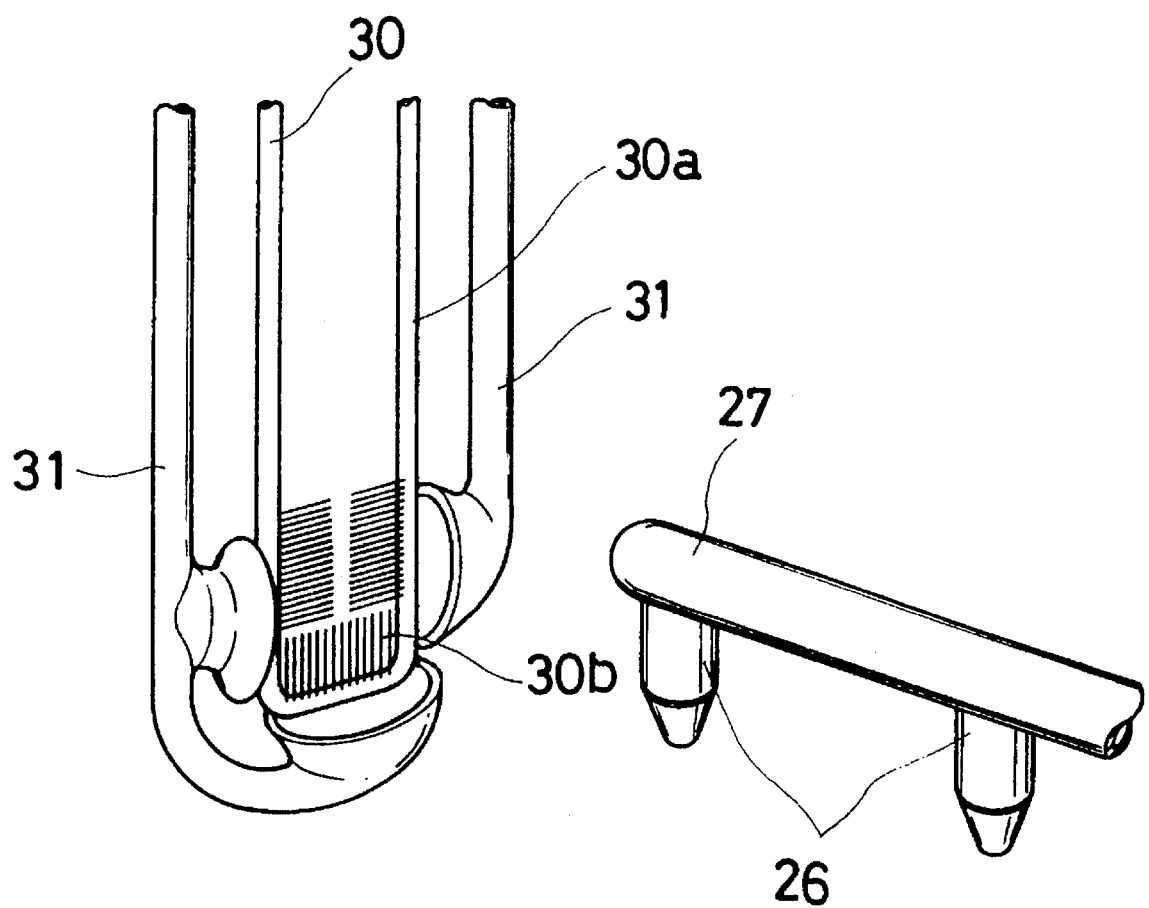
FIG. 3 is an oblique view of the essential portions of the granulating-coating apparatus shown in FIG. 1.
Figure 4:
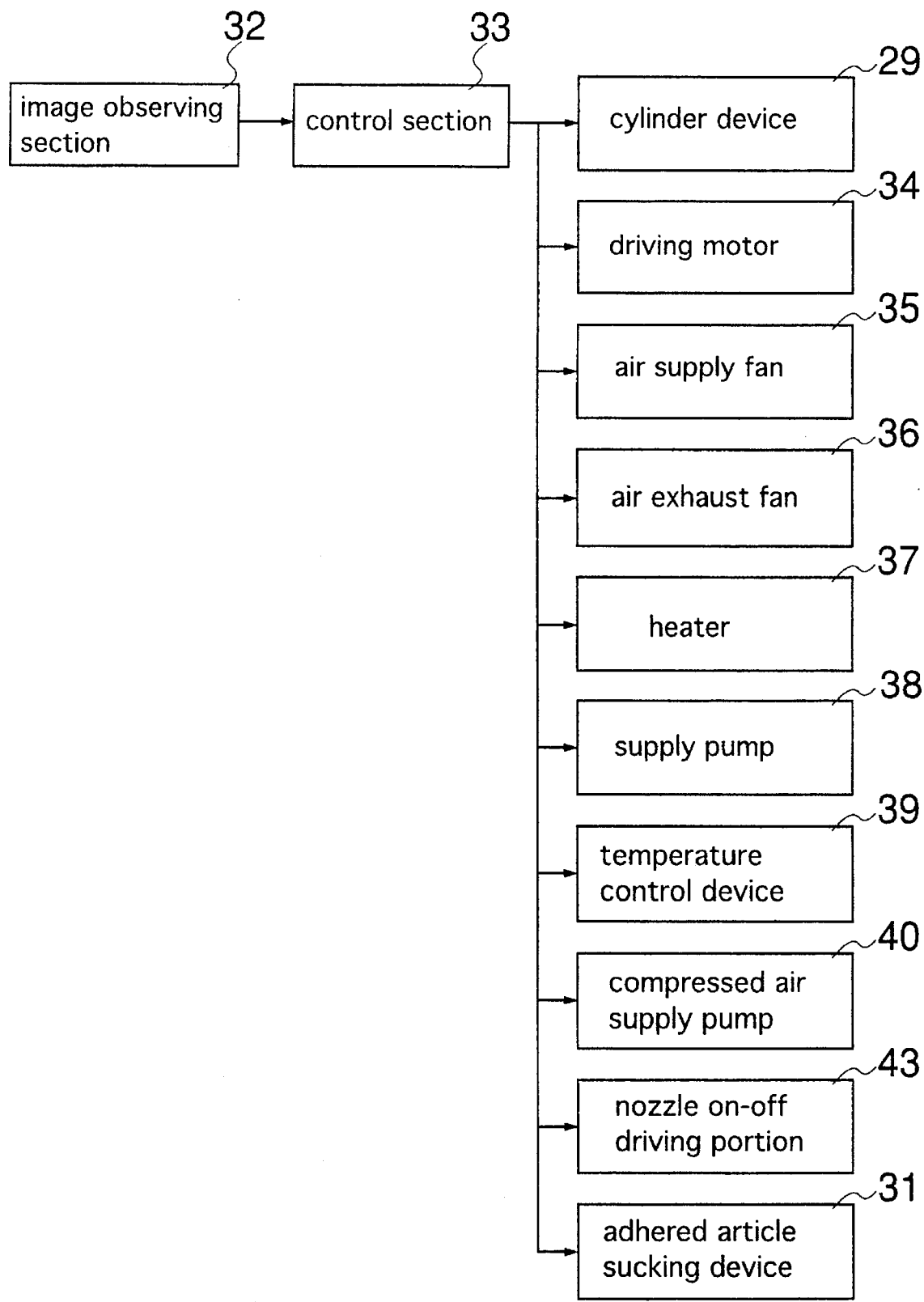
FIG. 4 is a block diagram showing a control circuit for controlling the operations of the granulating-coating apparatus shown in FIG. 1.
Figure 5:
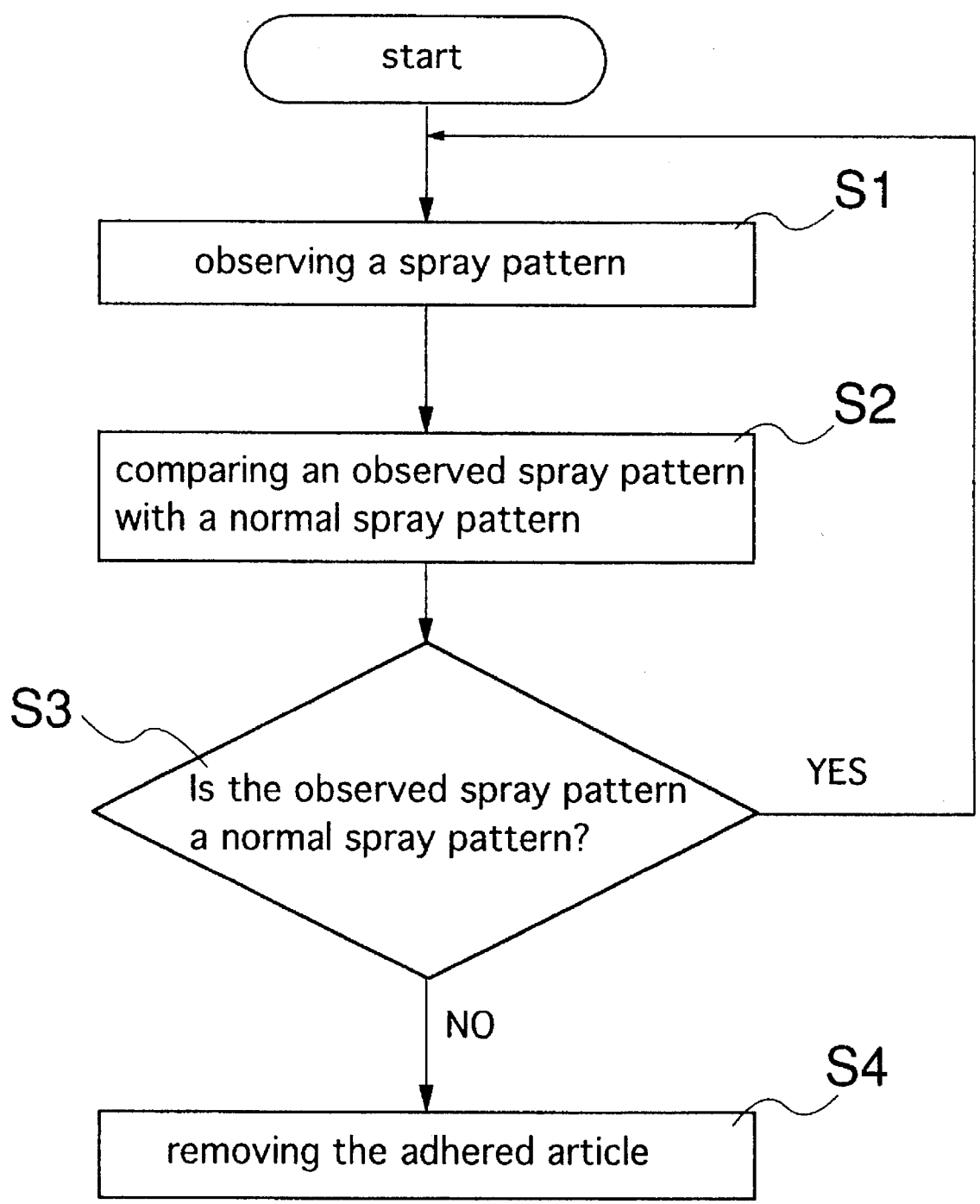
FIG. 5 is a flow chart showing the procedure of operations of the granulating-coating apparatus shown in FIG. 1.
Figure 6:
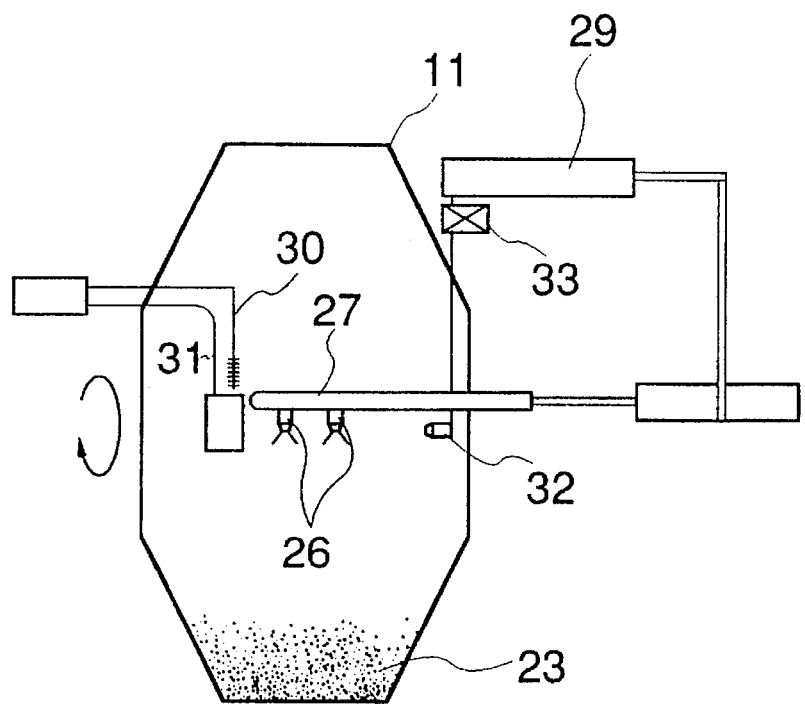
FIG. 6 is an explanatory view showing an operation of removing adhered articles in the granulating-coating apparatus shown in FIG. 1.
Figure 7:
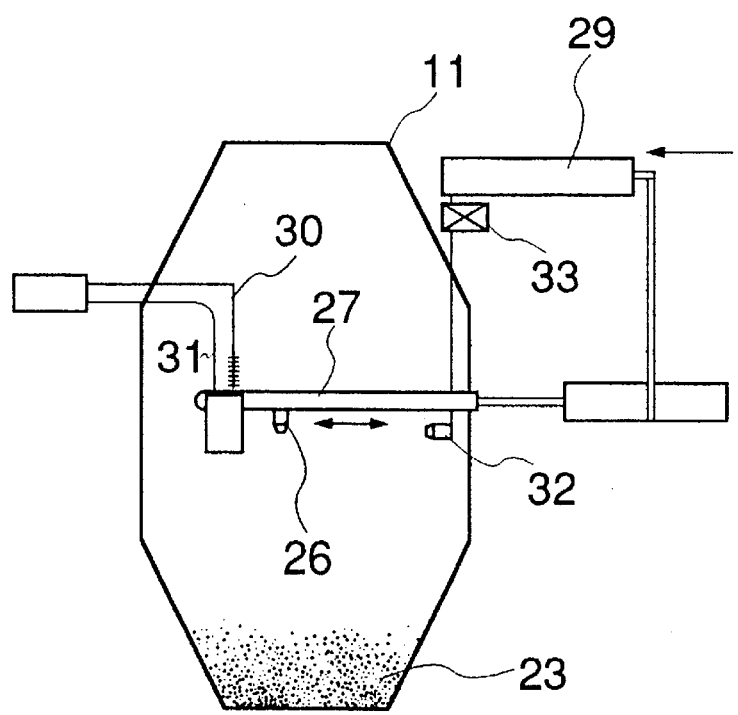
FIG. 7 is an explanatory view showing an operation of removing adhered articles in the granulating-coating apparatus shown in FIG. 1.

FIG. 1 is the sectional view showing one embodiment of the present invention. FIG. 2 is the sectional view taken along the line II—II of the granulating-coating apparatus. FIG. 3 is the oblique view of the essential portions of the granulating-coating apparatus. FIG. 4 is the block diagram showing a control circuit for controlling the operations of the granulating-coating apparatus. FIG. 5 is the flow chart showing the procedure of operations of the granulating-coating apparatus. FIGS. 6 and 7 are the explanatory views showing operations of removing the adhered articles in the granulating-coating apparatus.

As shown in FIG. 1, in a granulating-coating apparatus in the embodiment, a rotary drum (processing container) 11 for receiving articles to be processed has a cylindrical portion 12 and conical portions 13a and 13b in the frusto-conical shape being positioned at opposite ends in the axial direction of this cylindrical portion 12 and being integral with the cylindrical portion 12. A multitude of air holes 12a smaller in size than the processed articles is formed in the cylindrical portion 12. A shaft portion 14 is formed to be integral with the conical portion 13a, and is supported by a bearing 15. A drive shaft 16 is secured to the conical portion 13b and supported by a bearing, not shown. This drive shaft 16 is rotatably driven by a motor, not shown, so that the rotary drum 11 can be rotated about a substantially horizontal axis.

Several air ducts 17 are provided integrally with the rotary drum 11 at the outside thereof, which extends from the cylindrical portion 12 to one 13b of the conical portions in parallel to the rotary axis. As shown in FIG. 2, the air ducts 17 amounting to eight in total are provided at predetermined intervals in the circumferential direction. However, the number of the air ducts 17 is not limited to eight.

A gas supply path 18 is connected to a tubular member 18a coupled to the shaft portion 14, and a gas exhaust path 21 is connected to a communicating hole 20 formed in the lower portion of an end plate 19 being in contact with respective opening ends of the air ducts 17. A lid member 22 is detachably mounted to an opening end of the tubular member 18a, and, in a state where the lid member 22 is detached, articles 23 to be processed such as tablets are fed into the rotary drum 11.

The articles 23 fed into the rotary drum 11 are accumulated at a bottom portion of the rotary drum 11 to thereby form an accumulated layer. Air (gas) is supplied into the rotary drum 11 from the gas supply path 18. The air flows through the accumulated layer, and thereafter flows into the gas exhaust path 21 through the air duct 17 located at the lower side of the rotary drum 11 according to the rotation of the rotary drum 11.

A supply pipe 25 for supplying a binder liquid or a coating liquid onto the received articles 23 is provided in the rotary drum 11. Two spray guns 26 for spraying a binder liquid and the like are mounted to the supply pipe 25 as illustrated at predetermined intervals in a downward direction, to thereby form a spraying means 27. The spraying means 27 is able to reciprocate in the axial direction of the rotary drum 11 by a cylinder device 29 through an arm 28, and, in a case shown in FIG. 1, the spraying means 27 is illustrated to be located at a retracted position in the rotary drum 11. When a rod 29a of the cylinder device 29 makes a stroke, the spraying means 27 is moved in the axial direction of the rotary drum 11 from the position shown in FIG. 1 to an advanced end position on the side of the lid member 22.

The granulating-coating apparatus shown in this embodiment is constructed such that the coating liquid or the binder liquid is sprayed from the spraying means 27 as described above, whereby a part of the coating liquid or the binder liquid is dried and solidified to form the adhered articles in the vicinity of the spray guns 26. If the adhered articles are left as they are, the adhered articles are peeled off and contaminate the articles 23, thereby deteriorating the quality of the articles 23. In order to prevent that, a brush (adhered article removing means) 30 for removing the adhered articles and an adhered article sucking device (adhered article receiving means) 31 for receiving the removed adhered articles are provided in order to prevent from the above mentioned contamination.

The constructions of the brush 30 and the adhered article sucking device 31 will hereunder be described in detail with reference to FIG. 3. The brush 30 comprises a support bar 30a which is formed in a substantially U-letter shape for example as illustrated and comprises a brush portion 30b, in which brushes is provided to extend inwardly from three directions at the lower portion of the support bar 30a. An adhered article sucking device 31 is provided in the vicinity of the brush 30, for sucking and receiving the adhered articles wiped off by the brush 30. The brush 30 is provided at a position on a course where the spraying means 27 is moved to the advanced end direction, in which the adhered articles on the spray guns 26 formed in the spraying means 27 can be wiped off by the brush portion 30b. That is, when the spraying means 27 is moved in a short stroke by the cylinder device 29 to have the spray guns 26 contacted with the brush portion 30b once or several times, whereby the adhered articles are wiped off and sucked by the adhered article sucking device 31. Wipe-off of the adhered articles may be performed by the reciprocatory motion of the spraying means 27 itself. Otherwise, the brush 30 itself may be vibrated at the position where the spray guns 26 are provided, or the spray guns 26 may be rotated with rotation of the supply pipe 25 as a rotary axis, to thereby wipe off the adhered articles by the brush portion 30b.

As shown in FIG. 1, an image observing section 32 is provided in the rotary drum 11 which can observe a spray pattern of the coating liquid or the binder liquid sprayed by the spraying means 27. A pattern obtained by the image observing section 32, i.e., an observed spray pattern, is transmitted to a control section 33 in which an operation of removing the adhered articles can be controlled. Such an arrangement may be adopted that the spraying means 27 is moved at predetermined time intervals to remove the adhered articles periodically without the provision of the image observing section 32 and the control section 33 and without the judgment of necessity for the operation of removing the adhered articles judged by the spray pattern.

FIG. 4 is the block diagram showing a control circuit for controlling operations of the above-described granulating-coating apparatus. One side of the control section 33 is electrically connected to the image observing section 32, and the other side of the control section 33 is electrically connected to: the cylinder device 29 for reciprocatingly moving the spraying means 27; a driving motor 34 for driving the rotary drum 11; an air supply fan 35; an air exhaust fan 36; a heater 37; a supply pump 38; a temperature control device 39; a compressed air supply pump 40; and to a nozzle on-off driving portion 43 and the like, respectively.

FIG. 5 is the flow chart showing the procedure of operations of the granulating-coating apparatus. When a switch is turned on to perform the processing of the articles 23 received in the rotary drum 11, Step S1 is carried out, whereby the spray pattern is observed by the image observing section 32. This observed spray pattern is transmitted to the control section 33, whereby Step S2 is carried out, in which the observed spray pattern is compared with a normal spray pattern previously inputted where there is no adhered article on the spray guns 26.

Then, the observed spray pattern is analyzed, and processing to the articles 23 is stopped and Step S4 is carried out, if it is judged in Step S3 that removal of the adhered articles is required because this observed spray pattern proves to be out of the normal spray pattern due to the adhesion of the coating liquid or the binder liquid to the spray guns 26. On the other hand, when it is judged that the observed spray pattern is a normal one, the routine returns to Step 1.

FIGS. 6 and 7 show the operation of removing the adhered articles in this embodiment, in which the adhered articles on the spray gun 26 in the spraying means 27 are removed, the articles 23 are prevented from being contaminated due to the drop of the adhered articles, while the binder liquid or the coating liquid is sprayed to perform granulating and coating, as described above.

Firstly, as shown in FIG. 6, in a state where the rotary drum 11 is rotated to perform granulating and coating for the articles 23 while the coating liquid or the binder liquid is sprayed from the spray guns 26 formed in the spraying means 27, the spray pattern is observed by the image observing section 32 and the observed spry pattern transmitted to the control section 33. If it is judged in the control section 33 that the observed spray pattern is caused to be changed from the original state into out of the normal spray pattern due to adhesion of a part of the coating liquid or the binder liquid to the spray guns 26 to thereby be dried and solidified, then, as shown in FIG. 7, spraying is stopped, the cylinder device 29 is operated by the control section 33, and the spraying means 27 is moved to the advanced end direction, so that the spray guns 26 reach the position of the brush 30 for removing the adhered articles provided on the side of the lid member 22 of the rotary drum 11. Then, the spraying means 27 is moved in a short stroke by the cylinder 29, whereby the spray guns 26 are caused to contact the brush 30 several times for cleaning, and the adhered articles are removed from the spray guns 26 and sucked by the adhered article sucking device 31. Since two spray guns 26 are provided in the apparatus shown in this embodiment, the above-described removing operation is firstly carried out for one of the spray guns 26, and thereafter, the similar removing operation is performed for the other of the spray guns 26.

The spraying means 27, in which the adhered articles have been removed from the spray guns 26 as described above, is returned to the retracted position in the rotary drum 11 by the cylinder device 29, and spraying is started again.

According to the granulating-coating apparatus in this embodiment, the adhered articles, which are adhered to the spray guns 26 formed in the spraying means 27 for spraying the binder liquid or the coating liquid onto the articles 23 received in the rotary drum 11, are removed by the brush 30, and the removed adhered articles are received into the adhered article sucking device 31. Therefore, it becomes possible to completely remove the adhered articles on the spray guns 26 in the spraying means 27 for spraying the binder liquid or the coating liquid, so that the articles 23 are not contaminated with the adhered articles removed.

Furthermore, the provision of the brush 30 and the adhered article sucking device 31 makes it possible to completely remove the adhered articles on the spray guns 26 in the spraying means 27 by use of a simplified construction without decreasing the effective capacity of the rotary drum 11.

Then, the articles 23, which have been granulated and coated, can be obtained as the processed articles having the satisfactory quality, and the damage caused by contamination such as dots and so on generated in the tablets and the like by peeling-off the adhered articles, is reduced in amount.

Further, the timing for removing the adhered articles is controlled by the image observing section 32 and the control section 33, so that the operation of removing the adhered articles can be carried out efficiently.

Figure 8:
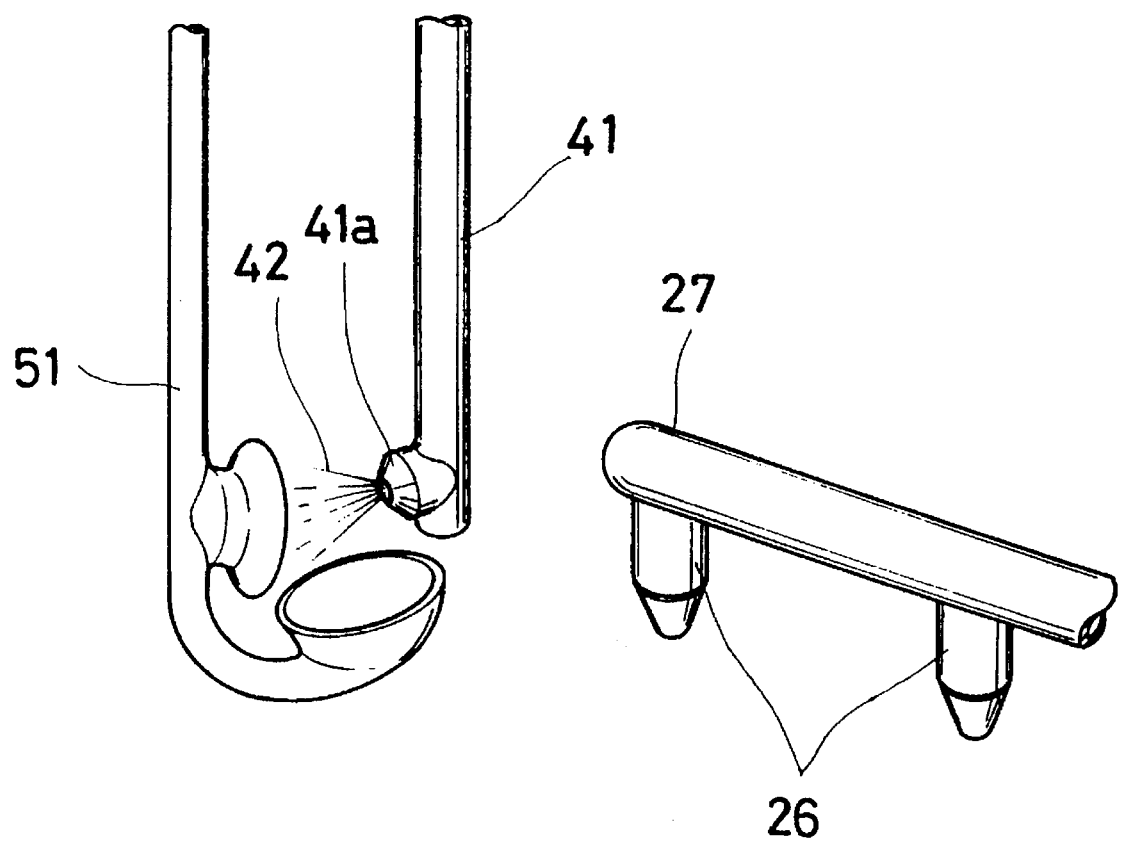
FIG. 8 is an oblique view of the essential portions showing another embodiment of the granulating-coating apparatus according to the present invention.
Figure 9:
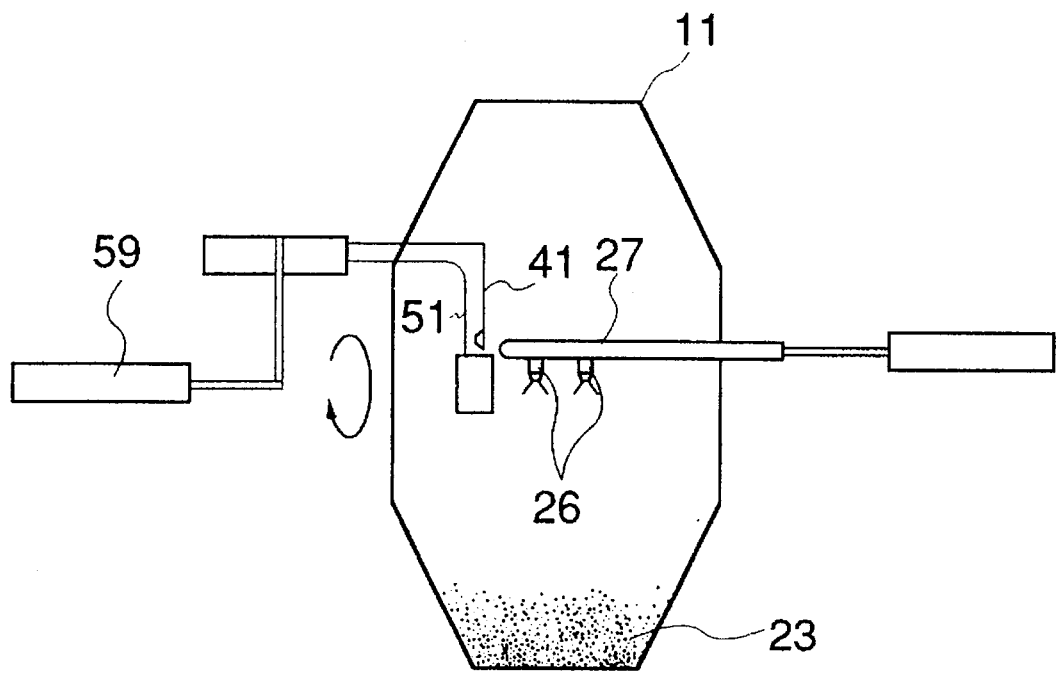
FIG. 9 is an explanatory view showing an operation of removing adhered articles in the granulating-coating apparatus shown in FIG. 8.
Figure 10:
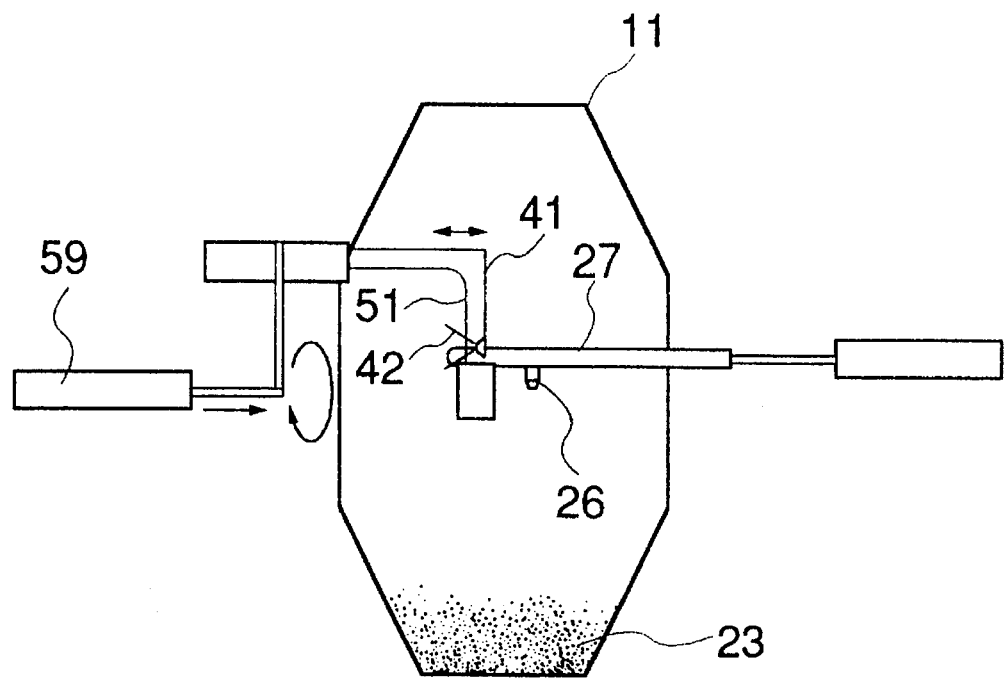
FIG. 10 is an explanatory view showing an operation of removing adhered articles in the granulating-coating apparatus shown in FIG. 8.

FIG. 8 is the oblique view of the essential portions showing another embodiment of the granulating-coating apparatus according to the present invention. FIGS. 9 and 10 are explanatory views showing the operation of removing the adhered articles in this embodiment.

As shown in FIG. 8, a compressed gas supply pipe 41 is provided in the granulating-coating apparatus in this embodiment, whereby the adhered articles on the spray guns in the spraying means 27 are removed by compressed air (adhered article removing means) 42 blown out of a nozzle 41a formed in the compressed gas supply pipe 41. Furthermore, as shown in FIGS. 9 and 10, the spraying means 27 is fixed to a predetermined position, and the compressed gas supply pipe 41 and an adhered article sucking device (adhered article receiving means) 51 are made to be movable in parallel to the axial line of the spraying means 27 by a cylinder device 59. The adhered article sucking device 51 and the compressed gas supply pipe 41 may be constructed to be moved out of the rotary drum 11 during granulating and coating, so that the both members can be protected from the adhesion.

Furthermore, in the granulating-coating apparatus shown in this embodiment, there are not provided the image observing section for observing the spray pattern and the control section for controlling carry-out of the predetermined operations, as differed from the apparatus shown in the above-described another embodiment. Incidentally, in this embodiment, the portions or members corresponding to those in the above embodiment are designated by the same reference numbers.

In this apparatus, for example, the spray guns 26 are cleaned at the time of a pause and/or at the time of drying operation during sugar coating, i.e., when the rotary drum 11 is rotated while spraying is stopped, so that the adhered articles are previously prevented from dropping onto the articles 23. When a pause operation shown in FIG. 10 is taken up as a subsequent operation of spraying operation i.e., as shown in FIG. 9, the coating liquid or the binder liquid is sprayed from the spraying means 27 while the rotary drum 11 is rotated to flow the gas through the articles 23, the cylinder device 59 is operated to move the compressed gas supply pipe 41 and the adhered article sucking device 51 to the positions where the spray guns 26 are provided, whereby the spray guns 26 are faced to the nozzle 41a formed in the compressed gas supply pipe 41 to blow out the compressed gas 42. Thereby, the adhered articles such as the coating liquid or the binder liquid are removed from the spray guns 26 by this compressed gas 42 and sucked into the adhered article sucking device 51, so that the spray guns 26 can be restored to the cleaned state. Thereafter, the cylinder device 59 is operated to return the compressed gas supply pipe 41 and the adhered article sucking device 51 to the conventional positions, and the spraying operation is restored again after the pause and drying operation.

In the granulating-coating apparatus in this embodiment, the adhered articles on the spray guns 26 are removed by the compressed gas 42 and received into the adhered article sucking device 51. Accordingly, it becomes possible to completely remove the adhered articles on the spray guns 26, so that the articles 23 can be prevented from being contaminated due to the drop of the removed adhered articles.

Furthermore, according to the apparatus in this embodiment, the adhered articles on the spray guns 26 can be completely removed by a simplified construction, so that the effective capacity of the rotary drum 11 is not reduced.

The articles 23, which have been granulated, etc., become one having satisfactory quality in which the damage caused by contamination such as dots is reduced.

Figure 11:
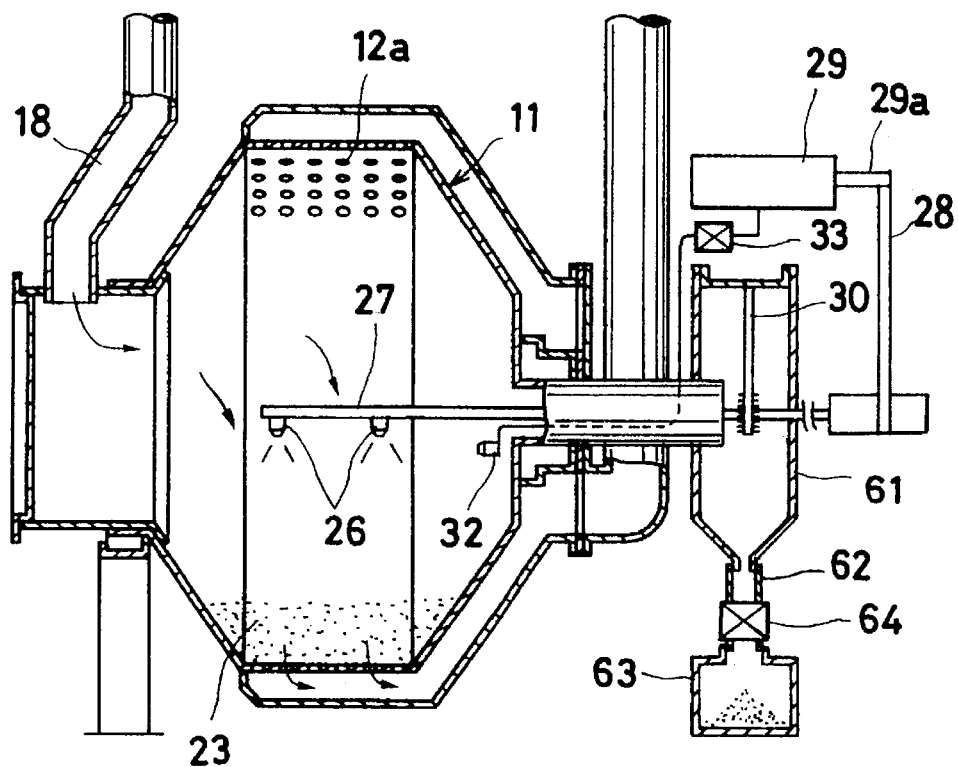
FIG. 11 is a sectional view showing a further embodiment of the granulating-coating apparatus according to the present invention.
Figure 12:
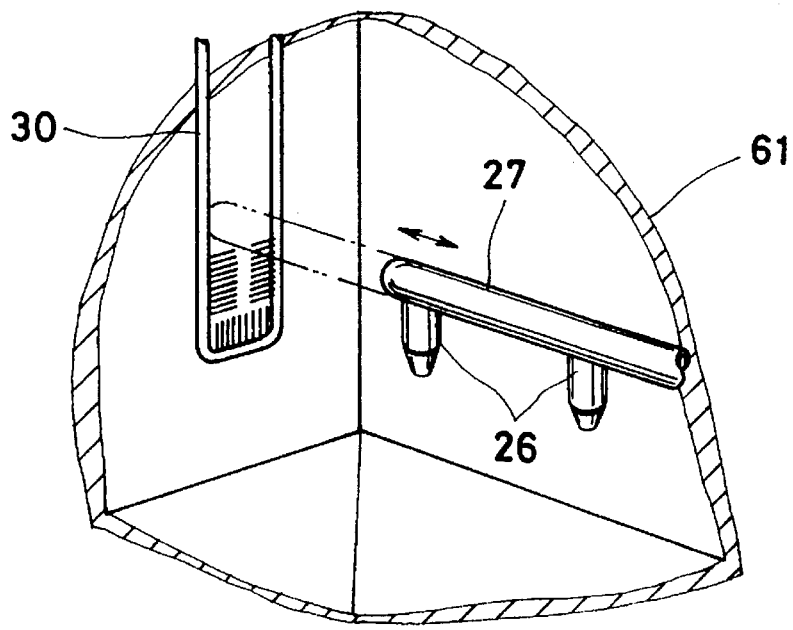
FIG. 12 is an oblique view of the essential portions showing the granulating-coating apparatus shown in FIG. 11.
Figure 13:
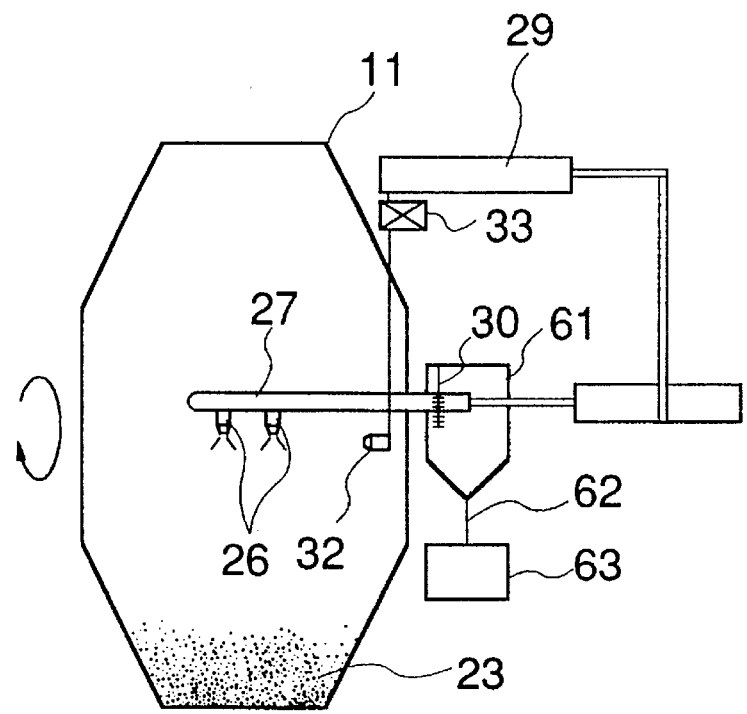
FIG. 13 is an explanatory view showing an operation of removing adhered articles in the granulating-coating apparatus shown in FIG. 11.
Figure 14:
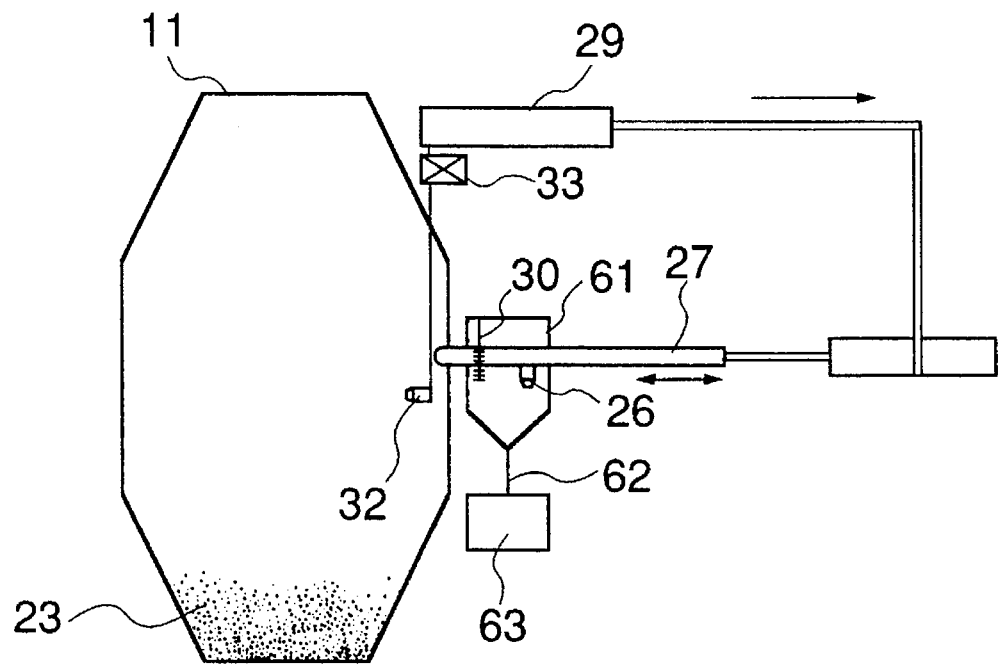
FIG. 14 is an explanatory view showing an operation of removing adhered articles in the granulating-coating apparatus shown in FIG. 11.

FIG. 11 is the sectional view showing a further embodiment of the granulating-coating apparatus according to the present invention. FIG. 12 is the oblique view of the essential portions of this embodiment. FIGS. 13 and 14 are the explanatory views showing the operation of removing the adhered articles in this embodiment.

In the granulating-coating apparatus in this embodiment, the spraying means 27, on which the spray guns 26 are mounted, is made to able to reciprocate by a cylinder device 29 through an arm 28. In the case of being shown in FIG. 11, this spraying means 27 is located at the advanced end position in the rotary drum 11. When the rod 29a of the cylinder device 29 makes a stroke, the spraying means 27 is moved from the position shown in FIG. 11 to the retracted end position at the outside of the rotary drum 11.

The brush (adhered article removing means) 30 for removing the adhered articles on the spray guns 26 in the spraying means 27 are provided in the direction of retracted end portion of the spraying means 27, i.e., at the outside of the rotary drum 11. An adhered article dropping member (adhered article receiving means) 61 for receiving the adhered articles removed, is provided in a state of including therein the brush 30.

Detailed description will hereunder be given of the brush 30 and the adhered article dropping member 61 as above with reference to FIGS. 11 and 12. The brush 30 is provided on a course of the spraying means 27 moving to the retracted end direction, whereby, when the spraying means 27 is moved by the cylinder device 29, the adhered articles on the spray guns 26 are wiped off. The adhered articles are dropped and guided to the outside of the granulating-coating apparatus from a funnel-shaped bottom portion through a pipe member 62 connected thereto and received into a box member 63. The adhered articles are received at the outside of the adhered article dropping member 61 as described above, so that the adhered articles are not accumulated in the member 61. A rotary valve 64 is provided in the intermediate portion of the pipe member 62, so that the air tightness in the adhered article dropping member 61 can be held.

Furthermore, similarly to the above-described first embodiment, the image observing section 32 for observing the spray pattern of the coating liquid or the binder liquid sprayed by the spraying means 27 is provided in the rotary drum 11. The pattern obtained in the image observing section 32 is transmitted to the control section 33 provided at the outside of the rotary drum 11, and the operation of removing the adhered articles is made by the order of this control section 33.

FIGS. 13 and 14 show the operation of removing the adhered articles in the granulating-coating apparatus in this embodiment.

As shown in FIG. 13, in a state where the articles 23 are being coated or bound while the coating liquid or the binder liquid is being sprayed from the spray guns 26 formed in the spraying means 27, when the pattern for removing the adhered articles is observed in the image observing section 32, spraying is stopped by the order of the control section 33 as shown in FIG. 14. Then, the spraying means 27 is moved in the retracted end direction, whereby the spray guns 26 reach the position where the brush 30 is provided for removing the adhered articles at the outside of the rotary drum 11. After that, the spraying means 27 is moved in a short stroke to cause the spray guns 26 to contact the brush 30 several times for cleaning, whereby the adhered articles are removed from the spray guns 26. The adhered articles are passed from the adhered article dropping member 61 through the pipe member 62 and are received into the box member 63 provided at the outside of the granulating-coating apparatus. Thereafter, the spraying means 27 is returned to the advanced end position in the rotary drum 11, whereby spraying is started again.

Accordingly, even in the granulating-coating apparatus shown in this embodiment, the adhered articles on the spray guns 26 in the spraying means 27 are completely removed, so that the articles 23 can be prevented from being contaminated with the adhered articles. Further, the effective capacity of the rotary drum 11 is not reduced.

Furthermore, the image observing section 32 and the control section 33 control the timing for removing the adhered articles, so that the operation of removing the adhered articles can be efficiently carried out.

Figure 15:
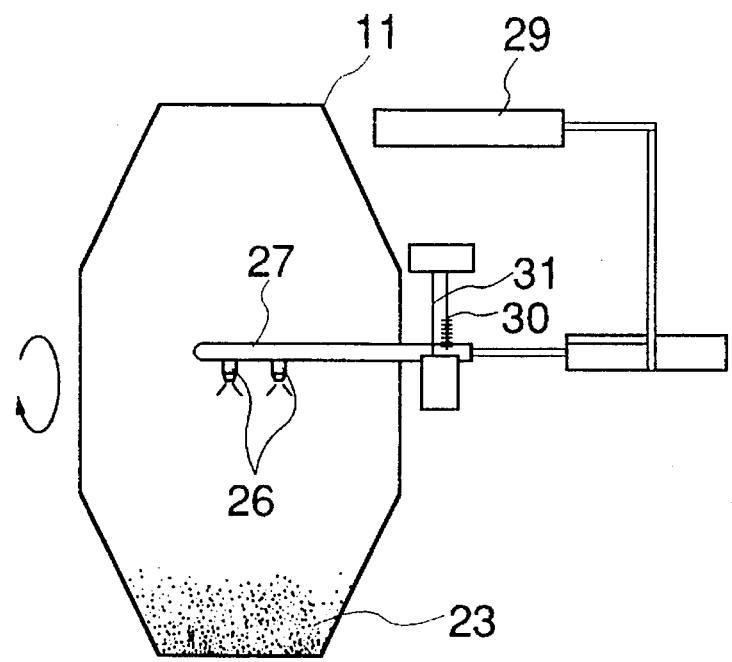
FIG. 15 is an explanatory view showing an operation of removing adhered articles in a still further embodiment of the granulating-coating apparatus according to the present invention.
Figure 16:
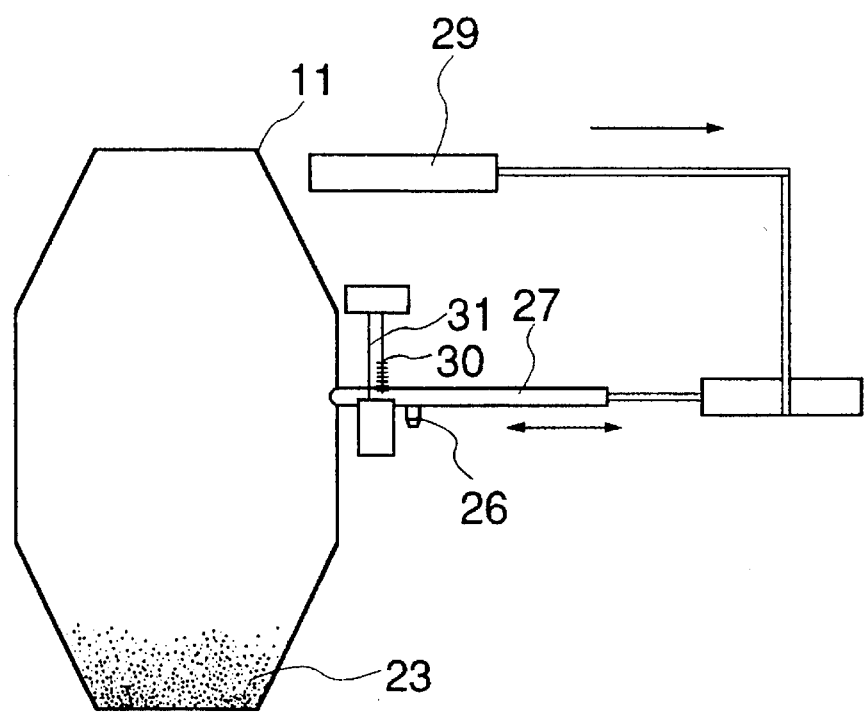
FIG. 16 is an explanatory view showing an operation of removing adhered articles in the granulating-coating apparatus shown in FIG. 15.

FIGS. 15 and 16 are the explanatory views showing the operation of removing the adhered articles in a further embodiment of the granulating-coating apparatus according to the present invention.

As illustrated, in the granulating-coating apparatus in this embodiment, the brush (adhered article removing means) 30 is used at the outside of the rotary drum 11, for removing the adhered articles on the spray guns 26 in the spraying means 27, and the adhered article sucking device (adhered article receiving means) 31 is provided in the vicinity of the brush 30, for receiving the adhered articles removed. In the granulating-coating apparatus in this embodiment, there are provided neither the image observing section for observing the spray pattern nor the control section for controlling predetermined operations by the observed spray pattern. Incidentally, in this embodiment also, the portions or members corresponding to those shown in the above-described embodiment are designated by the same reference numbers.

The following is the description of the operation of removing the adhered articles in the granulating-coating apparatus shown in this embodiment.

In this embodiment, for example, a time laps, during which the adhered articles on the spray guns 26 to an extent where the spray pattern becomes in this order, is found previously, whereby the spray guns 26 are cleaned at intervals of this time laps, so that the adhered articles can be prevented from dropping onto the articles 23. That is, as shown in FIG. 15, the coating liquid or the binder liquid is sprayed from the spraying means 27 while the rotary drum 11 is rotated to cause the gas to flow through the articles 23. In this state, when the above-described time laps is reached, as shown in FIG. 16, processing to the articles 23 is stopped, and the spraying means 27 is moved to the position where the brush 30 is disposed at the outside of the rotary drum 11. Then, the adhered articles are removed and sucked by the adhered article sucking device 31, whereby the spray guns 26 are restored to the cleaned state. After the removal, the spraying means returns to the state shown in FIG. 15, i.e., the advanced end position in the rotary drum 11, whereby the spraying is started again.

As described above, in the granulating-coating apparatus in this embodiment also, the adhered articles on the spray guns 26 can be completely removed, so that the articles 23 are not contaminated. Furthermore, the effective capacity of the rotary drum 11 is not reduced.

Detailed description has been given of the present invention completed by the inventors hereinabove with reference to the embodiments. However, the present invention should not be limited to the above embodiments, and the present invention may be variously modified within a range not departing from the technical gist.

For example, as shown in the above embodiment, it is not limited to that either of the spraying means 27, the brush 30 for removing the adhered articles on the spray guns 26 in the spraying means 27 or the adhered article sucking device 31 for receiving the adhered articles, is made movable, and, on the other hand, the both sides may be made movable. That is, it is sufficient that the both sides are movable relatively to each other. Therefore, in case there are provided a plurality of spray guns 26 to be cleaned, the adhered articles are removed at the time when the spray guns 26 reach one or several points in moving courses either one or both thereof.

The number of the spray guns 26 is not limited to two as described in these embodiments, and one or more than three spray guns may be provided. Particularly, in a large-sized apparatus, it is desirable to provide a plurality of spray guns 26, however, a smaller number of spray guns 26 may be provided by use of reciprocatory motion of the spraying means 27, as compared with the case where the fixed spray guns are used. Furthermore, when a plurality of spray guns 26 are provided, the adhered article removing means such as the brush 30 may be operated in different points depending upon the spray guns 26, or a plurality of spray guns 26 may be cleaned at the same point.

As for the reciprocatory motion of the spraying means 27, other than the member for moving all of the spray guns 26, the supply pipe 25 extending to the spray guns 26 and the air supply pipe, not shown, and the like as shown in the above embodiment, such an arrangement may be adopted that the spray guns 26 are movably mounted on rails, and moved by use of a metallic wire, and the supply pipe and the like are made to follow the spray guns 26. Furthermore, such a reciprocatory motion of the spraying means 27 may be carried out that the spraying means 27 runs at all times while spraying the coating liquid or the binder liquid, the spraying means 27 is stopped at any position for spraying, further, the spraying means 27 runs while spraying and is stopped while taking a rest, or the spraying means 27 takes any of other optional running patterns.

When the adhered articles are removed in the processing container such as the rotary drum 11, it is desirable to carry out removing the adhered articles by a dry type method, and, in this case, the brush 30 and the compressed gas 42 may be used as the adhered article removing means. Furthermore, when the adhered articles are removed at the outside of the processing container, such a wet type method for removing may be adopted that the cleaning liquid is sprayed onto the spray guns 26, or the spray guns 26 are immersed into the cleaning liquid.

The adhered article removing means, such as the brush 30 and the compressed gas 42, and the adhered article receiving means, such as the adhered article sucking device 31, may be fixed to one or a several positions in the spraying means 27, or may be made movable. In this case, it is necessary to adopt such a construction that the spraying means 27, the adhered article removing means and the adhered article receiving means are adopted to meet at one or several points and then the adhered article removing operation is carried out there.

The adhered article dropping member 61 may be constructed such that the bottom portion thereof is formed in a box member to drop the adhered articles therein, other than that the bottom portion thereof is formed to provide the funnel shape, the pipe member is connected thereto and the adhered articles are taken out to the outside as shown in this embodiment.

In this embodiment, the granulating-coating apparatus is constructed such that the processing container is made to be the rotary drum 11 which is rotated about the horizontal rotary axis. However, it is of course possible to apply the present invention to a granulating-coating apparatus having a fluidized bed, in which the gas is introduced from under the articles 23 received in the container, whereby the fluidized bed is formed. In this case, since it is desirable to fix the spraying means normally in the fluidized bed granulating-coating apparatus, the device such as the cylinder device 29 for moving the spraying means 27 is not provided, and, merely, the adhered article removing means and the adhered article receiving means may be operated at a predetermined interval time, or the both means may be operated by the image analysis.

This present invention is applicable to various types of granulating and coating, similarly to the rotary drum or the fluidized bed granulating-coating apparatus.

What is claimed is:

1. A granulating-coating apparatus, comprising:
   a fluidized bed container in which articles to be processed are contained and gas is introduced from under said articles whereby a fluidized bed is formed;
   a processing container, in which articles to be processed are contained;
   a spraying means including a spray gun for spraying a binder liquid or a coating liquid onto said articles;
   an adhered article removing means for removing adhered articles adhering to said spray gun; and
   an adhered article receiving means for receiving said adhered articles removed by said adhered article removing means;
   whereby at least one of said spraying means and said adhered article removing means is reciprocally movable in the horizontal direction relative to the other.

2. The granulating-coating apparatus as set forth in claim 1, wherein said adhered article receiving means comprises a suction device provided in the vicinity of said adhered article removing means, for receiving by suction said adhered articles removed by said adhered article removing means.

3. The granulating-coating apparatus as set forth in claim 1, wherein said adhered article receiving means comprises a receiving vessel provided outside said fluidized bed container, said vessel including therein said adhered article removing means, for receiving said adhered articles removed by said adhered article removing means and dropped from said spray gun.

4. The granulating-coating apparatus as set forth in claim 3, wherein said adhered article receiving vessel comprises a funnel-shaped bottom portion, wherein dropped adhered articles are guided to the outside of said adhered article receiving vessel from said bottom portion through a pipe member connected thereto, and the dropped adhered articles are received into a box member provided under said pipe member.

5. The granulating-coating apparatus as set forth in claim 4, wherein a rotary valve is provided in an intermediate portion of said pipe member, to maintain air tightness in the adhered article receiving vessel.

6. The granulating-coating apparatus as set forth in claim 1, wherein said adhered article removing means comprises a brush for wiping off said adhered articles from said spray gun.

7. The granulating-coating apparatus as set forth in claim 6, wherein said brush includes a substantially U-shape support bar and a brush bristle portion wherein bristles extend inwardly from three directions at a lower portion of said support bar.

8. The granulating-coating apparatus as set forth in claim 7, wherein said adhered article receiving means comprises suction means in the vicinity of said bristles, whereby adhered articles removed by said brush portion are sucked and received by said suction means.

9. The granulating-coating apparatus as set forth in claim 1, wherein said adhered article removing means is a compressed gas supply pipe-for providing gas to blow off articles adhering to said spray gun.

10. The granulating-coating apparatus as set forth in claim 9, wherein said adhered article receiving means is an adhered article suction device provided in the vicinity of said compressed gas supply pipe, at a facing position to said compressed gas supply pipe, in front of and under said compressed gas supply pipe, whereby adhered articles removed by said compressed gas is sucked and received by said adhered article-sucking device.

11. The granulating-coating apparatus as set forth in claim 1, wherein said adhered article removing means reciprocates and said adhered article receiving means reciprocates together with said adhered article removing means.

12. The granulating-coating apparatus as set forth in claim 1, wherein said apparatus further comprises:

an observation section for observing a spray pattern of a binder or a coating liquid sprayed from said spraying means; and a control section for analyzing the observed spray pattern and for controlling an operation for removing said adhered articles.

13. The granulating-coating apparatus as set forth in claim 1, wherein said processing container is a rotary drum rotated about a substantially horizontal rotary axis.

14. A method of granulating and coating, wherein articles to be processed are granulated or coated by use of a granulating coating apparatus comprising a processing container, in which articles to be processed are contained, said processing container comprising a fluidized bed container, in which gas is introduced from under said articles received in said container, to form a fluidized bed;

a spraying means including a spray gun for spraying a binder liquid or a coating liquid onto said articles;

an adhered article removing means for removing adhered articles adhering to said spray gun; and an adhered article receiving means for receiving said adhered articles removed by said adhered article removing means; whereby at least one of said spraying means and said adhered article removing means is reciprocally movable in the horizontal direction relative to the other, said method including the steps of horizontally reciprocating at least one of said spraying means and said adhered article removing means moves whereby adhered articles on said spray gun are removed by said adhered article removing means and said adhered articles that are removed are received into said adhered article receiving means and granulating or coating said articles by introducing gas from under said articles into said container.

15. The method of granulating and coating as set forth in claim 14, wherein said adhered article receiving means reciprocates together with said adhered article removing-means.

16. The method of granulating and coating as set forth in claim 14, wherein said apparatus further comprises an observation section for observing a spray pattern of a binder or a coating liquid sprayed from said spraying means; and a control section for analyzing the observed spray pattern and for controlling an operation of removing said adhered articles and including the further step of removing said adhered articles by said adhered article removing means when said control section analyzes an observed-spray pattern and determines that a removing operation is needed.

17. The method of granulating and coating as set forth in one of the claims 14 to 16, wherein said processing container is a rotary drum rotated about a substantially horizontal rotary axis and having a layer of articles therein, and comprising the further step of granulating or coating said articles by introducing gas through said layer while spraying a liquid through said spray means.

18. A granulating-coating apparatus, comprising:

a rotary drum for containing articles to be processed, said drum being rotatable about a substantially horizontal axis;

a processing container, in which articles to be processed are contained;

a spraying means including a spray gun for spraying a binder liquid or a coating liquid onto said articles;

an adhered article removing means for removing adhered articles adhering to said spray gun;

both said spraying means and said adhered article removing means being reciprocally movable, horizontally, whereby said adhered article removing means is reciprocally movable relative to said spraying means to remove articles adhered to said spraying means; and an adhered article receiving means for receiving said adhered articles removed by said adhered article removing means.

19. The granulating-coating apparatus as set forth in claim 18, wherein said adhered article receiving means comprises a suction device provided in the vicinity of said adhered article removing means, for receiving by suction said adhered articles removed by said adhered article removing means.

20. The granulating-coating apparatus as set forth in claim 18, wherein said adhered article receiving means further comprises a receiving vessel provided outside said processing container, said vessel including therein said adhered article removing means, for receiving said adhered articles removed by said adhered article removing means and dropped from said spray gun.

21. The granulating-coating apparatus as set forth in claim 20, wherein said adhered article receiving vessel comprising a funnel-shaped bottom portion, wherein dropped adhered articles are guided to the outside of said adhered article receiving vessel from said bottom portion through a pipe member connected thereto, and the dropped adhered articles are received into a box member provided under said pipe member.

22. The granulating-coating apparatus as set forth in claim 21, wherein a rotary valve is provided in an intermediate portion of said pipe member, to maintain air tightness in the adhered article receiving vessel.

23. The granulating-coating apparatus as set forth in claim 18, wherein said adhered article removing means comprises a brush for wiping off said adhered articles from said spray gun.

24. The granulating-coating apparatus as set forth in claim 23, wherein said brush includes a substantially U-shape support bar and a brush bristle portion wherein bristles extend inwardly from three directions at a lower portion of said support bar.

25. The granulating-coating apparatus as set forth in claim 24, wherein said adhered article receiving means comprises suction means in the vicinity of said bristles, whereby adhered articles removed by said brush portion are sucked and received by said suction means.

26. The granulating-coating apparatus as set forth in claim 18, wherein said adhered article removing means is a compressed gas supply pipe for providing gas to blow off articles adhering to said spray gun.

27. The granulating-coating apparatus as set forth in claim 26, wherein said adhered article receiving means is an adhered article suction device provided in the vicinity of said compressed gas supply pipe, at a facing position to said compressed gas supply pipe, in front of and under said compressed gas supply pipe, whereby adhered articles removed by said compressed gas is sucked and received by said adhered article-sucking device.

28. The granulating-coating apparatus as set forth in claim 18, wherein said adhered article removing means reciprocates and said adhered article receiving means reciprocates together with said adhered article removing means.

29. The granulating-coating apparatus as set forth in claim 18, wherein said apparatus further comprises:

an observation section for observing a spray pattern of a binder or a coating liquid sprayed from said spraying means; and a control section for analyzing the observed spray pattern and for controlling an operation for removing said adhered articles.

30. A method of granulating and coating, wherein articles to be processed are granulated or coated by use of a processing container having a rotary drum rotatable about a horizontal axis, in which articles to be processed are contained and into which gas is introduced from under said articles;

a spraying means including a spray gun for spraying a binder liquid or a coating liquid onto said articles;

an adhered article removing means for removing adhered articles adhering to said spray gun; and an adhered article receiving means for receiving said adhered articles removed by said adhered article removing means; whereby said spraying means and said adhered article removing means are reciprocally movable in the horizontal direction, said method including the steps of:

horizontally reciprocating said spraying means and said adhered article removing means moves whereby adhered articles on said spray gun are removed by said adhered article removing means and said adhered articles that are removed are received into said adhered article receiving means; and granulating or coating said articles by introducing gas from under said articles into said container.

31. The method of granulating and coating as set forth in claim 30, wherein said adhered article receiving means reciprocates together with said adhered article removing-means.

32. The method of granulating and coating as set forth in claim 30, wherein said apparatus further comprises an observation section for observing a spray pattern of a binder or a coating liquid sprayed from said spraying means; and a control section for analyzing the observed spray pattern and for controlling an operation of removing said adhered articles and including the further step of removing said adhered articles by said adhered article removing means when said control section analyzes an observed-spray pattern and determines that a removing operation is needed.

* * * * *